(12) United States Patent
Pieczul et al.

(10) Patent No.: US 9,344,279 B2
(45) Date of Patent: May 17, 2016

(54) MOBILE DEVICE-BASED KEYPAD FOR ENHANCED SECURITY

(71) Applicant: International Business Machines Corporation, Armonk, NY (US)

(72) Inventors: Olgierd Stanislaw Pieczul, Dublin (IE);
Joseph Celi, Jr., Boca Raton, FL (US);
Mark McGloin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/484,371

(22) Filed: Sep. 12, 2014

(65) Prior Publication Data

US 2016/0080152 A1    Mar. 17, 2016

(51) Int. Cl.
*H04L 29/06* (2006.01)
*H04L 9/32* (2006.01)
*H04W 12/06* (2009.01)

(52) U.S. Cl.
CPC ............ *H04L 9/3226* (2013.01); *H04W 12/06* (2013.01); *H04L 2209/24* (2013.01)

(58) Field of Classification Search
CPC .. H04L 9/3226; H04L 2209/24; H04W 12/06
USPC ....................................................... 713/168
See application file for complete search history.

(56) References Cited

U.S. PATENT DOCUMENTS

| 8,380,177 | B2 | 2/2013 | Laracey |
| 8,510,222 | B2 | 8/2013 | Bachrany et al. |
| 8,632,000 | B2 | 1/2014 | Laracey |
| 8,725,641 | B2 | 5/2014 | Bachrany et al. |
| 2006/0089908 | A1 | 4/2006 | Keohane et al. |
| 2006/0191996 | A1* | 8/2006 | Drummond .......... G06Q 20/327 235/379 |
| 2011/0093389 | A1* | 4/2011 | Singhal .................. G06Q 20/02 705/43 |
| 2013/0124410 | A1 | 5/2013 | Kay et al. |
| 2013/0124411 | A1 | 5/2013 | Kobres et al. |

FOREIGN PATENT DOCUMENTS

GB        2461975 A  *  1/2010  ............. G06Q 20/20

OTHER PUBLICATIONS

Anonymous, "Using NFC to enable faster and more secure bank operations," IPCOM000212822D, Nov. 29, 2011.

* cited by examiner

*Primary Examiner* — Mohammad W Reza
(74) *Attorney, Agent, or Firm* — David B. Woycechowsky; David H. Judson

(57) ABSTRACT

An authentication channel is established between a mobile device and a transaction terminal that uses a keypad for access control. The terminal keypad is assumed to be untrusted, whereas the mobile device has a trusted interface that only the device user can access and use. The transaction terminal includes a short-range communication device, and a keypad interface application configured to communicate with an external keypad device in lieu of the transaction terminal's own keypad. The mobile device includes a mobile app. In response to detecting a user access request, a handshake protocol is performed between the keypad interface application in the transaction terminal and the keypad interface function in the mobile device. If the handshake protocol succeeds, the user is notified that the transaction terminal is trusted. The user then enters his or her password and/or PIN on the mobile device in lieu of direct entry via the terminal keypad.

17 Claims, 4 Drawing Sheets

MOBILE DEVICE-BASED KEYPAD FOR ENHANCED SECURITY

BACKGROUND OF THE INVENTION

1. Technical Field

This disclosure relates generally to information security and, in particular, to access control schemes that are implemented using mobile devices.

2. Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications.

There are numerous places where users are required to enter on a keypad passwords or personal identification numbers (PINs) to obtain products or physical access. A typical example is a keypad associated with an automated teller machine (ATM), or a keypad associated with a secure facility. As keypad access proliferates, so too have attack strategies aimed at acquiring those passwords and PINs. Typical attacks involve scanners, hidden cameras, looking over a person's shoulder, and the like. Many solutions have been proposed to tackle this security issue, and they usually involve physical or operational changes to the keypad itself.

Mobile device-based interactions with ATMs are also known in which a mobile phone is used to facilitate an ATM transaction. These systems, however, require a tight coupling between, on the one hand, a mobile banking app executing on the device and, on the other hand, the bank's back-end server handling the transaction. These known solutions require trust-based integration between the mobile app and the ATM and back-end systems, making them costly and difficult to implement.

BRIEF SUMMARY

An authentication channel is established between a mobile device and a transaction terminal (e.g., an ATM) that uses a keypad (or the like) for access control. The terminal keypad is assumed to be an untrusted user interface because, e.g., it may be monitored or otherwise capable of being compromised. The mobile device, in contrast, is a trusted device with a trusted user interface in the form of the keypad (whether physical or software-based) that preferably only the device user can access and use. According to this disclosure, the transaction terminal is augmented to include a short-range communication device, and a keypad interface application that is configured to communicate with an external keypad device in lieu of (or in addition to) the transaction terminal's own keypad. The mobile device includes a mobile app (or native application) that includes the keypad interface functionality adapted to communicate with the keypad interface application running in the transaction terminal. In operation, the short-range communication device in the transaction terminal is configured to detect and communication with the external keypad device running in the mobile device. In response to detection of a request for access to the transaction terminal, a handshake protocol is performed between the keypad interface application in the transaction terminal and the keypad interface function in the mobile device. This protocol is designed to establish whether the terminal is trusted by the mobile device and, in particular, the external keypad device executing on the mobile device. If the handshake protocol succeeds, the user is notified that the transaction terminal is trusted. The user then enters his or her password and/or PIN (or, more generally, a "credential") on the mobile device in lieu of direct entry via the terminal keypad; the credential data is then transmitted over the authentication channel to facilitate the user's access to the rest of the terminal functionality (whatever it may be). Preferably, the authentication channel itself is also secured, e.g., using cryptographic techniques to ensure that the transmission of the credential is not compromised.

In this manner, the approach in effect replaces a component of the transaction terminal (the standard keypad) that is untrusted with a mobile device-supported and functionally-equivalent component (the external keypad device) that is trusted by the user. No a priori or transaction-based trust model needs to be established in advance or to otherwise enable the user to use the transaction terminal in the usual way. The handshake protocol (between the respective mobile-device based and transaction terminal-based keypad applications) ensures that the user obtains necessary information—namely, that the transaction terminal can be trusted—prior to the user using his or her external keypad device.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
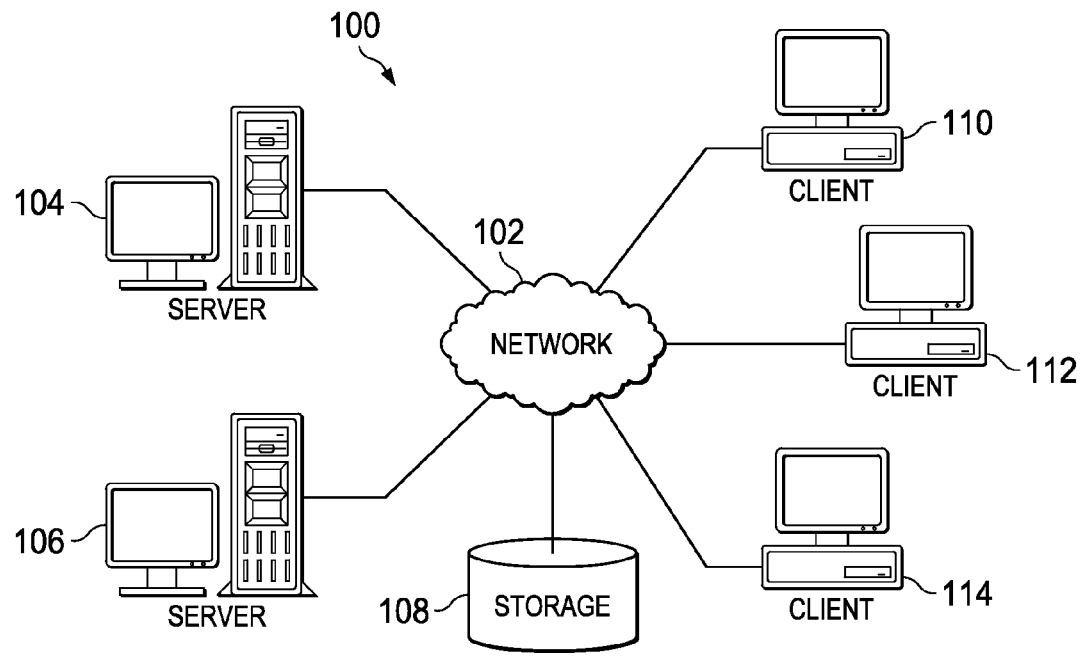
FIG. 1 depicts an exemplary block diagram of a distributed data processing environment in which exemplary aspects of the illustrative embodiments may be implemented.
Figure 2:
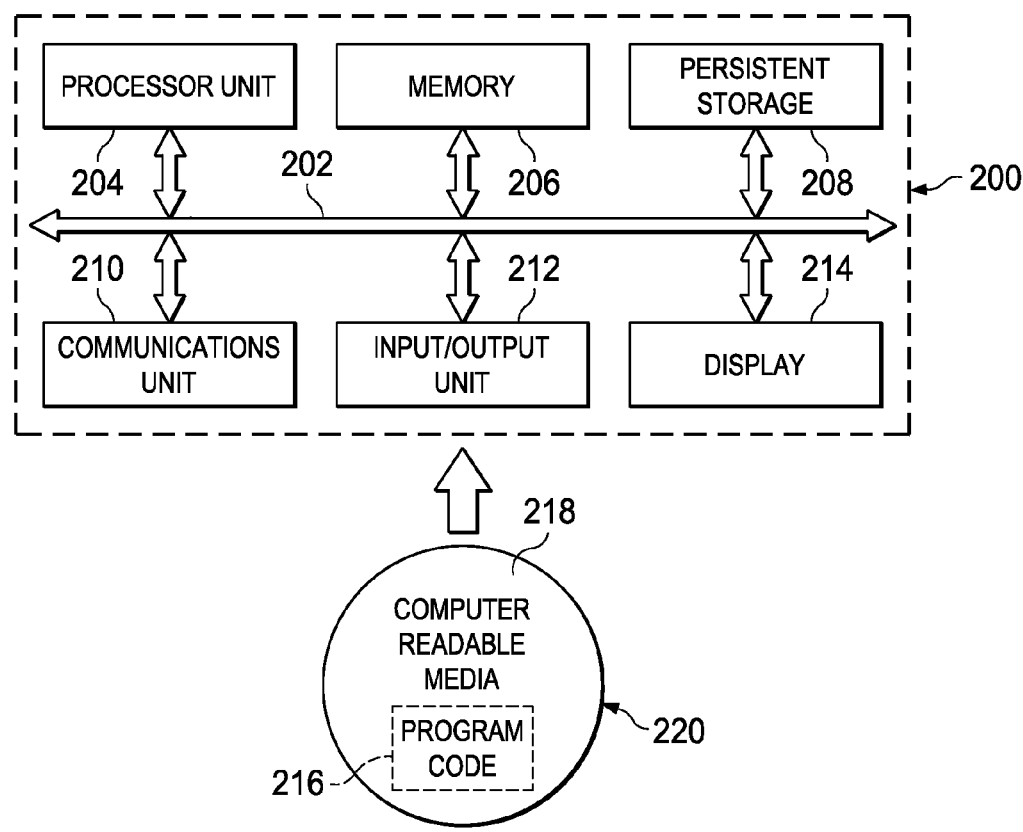
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
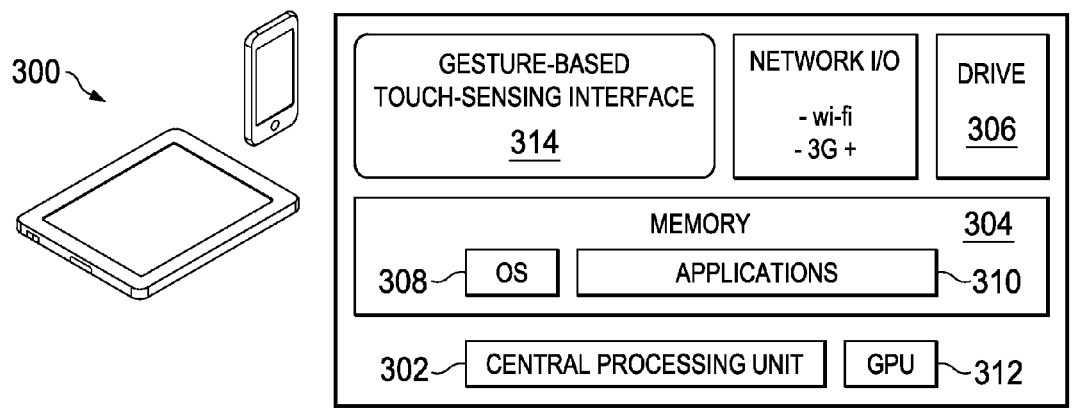
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards or keypads, cameras, microphones, and the like.

For example, a mobile device as used herein is a 3G—(or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Typically, computing devices such as described also implement networking technology for exchanging data over short distances, such as Bluetooth, which is a wireless technology standard that uses short-wavelength UHF radio waves in the ISM band from 2.4 to 2.485 GHz). Devices that implement Bluetooth can create personal area networks (PANs). Bluetooth can connect to several devices at once. Alternatives to Bluetooth include, without limitation, Near Field Communication (NFC), ultra wideband, induction wireless, and others.

The underlying network transport may be any communication medium including, without limitation, cellular, wireless, Wi-Fi, small cell (e.g., Femto), and combinations thereof.

Transaction Terminals Having Keypad-Based Access Control

Automated banking machines are well known. A common type of automated banking machine used by consumers is an Automated Teller Machine (hereinafter "ATM"). ATMs enable customers to carry out a variety of banking transactions by interacting with the machine rather than a human teller. Examples of banking transactions that are commonly carried out using ATMs may include such as withdrawals, deposits, transfer of funds between accounts, payment of bills, and account balance inquiries and any other products that an entity may want to enable to their customers. The types of transactions that a customer may carry out at a particular ATM are determined by hardware and software configuration of that particular ATM as well as the hardware and software configuration of the financial institution to which the particular ATM is connected.

Figure 4:
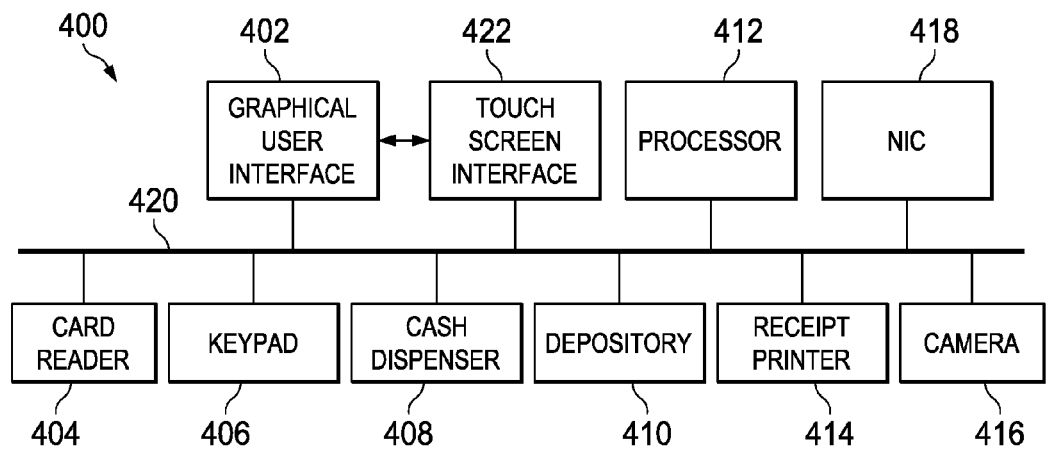
FIG. 4 illustrates a representative transaction terminal (namely, an ATM) that includes a keypad to facilitate user access.

With specific reference to FIG. 4, there is displayed a schematic view of components of ATM 400 utilized in connection with one exemplary embodiment. ATM 400 includes a graphical user interface (GUI) 402, a card reader 404, a keypad 406, cash dispenser (with dispenser slot) 408, depository device (with deposit slot) 410. Additionally, ATM 400 includes a processor 412, receipt printer 414, a security camera 416, and network interface device 418. Each of the devices is operatively connected to an internal control bus 420 by which the intercommunications among the various devices are completed. In the illustrative embodiment, GUI 402 includes a touch screen 422 (as well as a display screen), which serves as an input/output (I/O) device for communicating with a user of the machine. As an input device, touch screen 422 receives input from the user while the user is interacting with the ATM. Alternate embodiments may include other types and/or additional I/O devices, such as audio speakers. In other embodiments, fewer or more functional devices may be utilized. It should be further understood that while the described embodiment is of an ATM, the principles may be employed in other types of customer-accessible transaction machines that may not necessarily carry out banking transactions (e.g., ticket issuing machines for an electronic vendor). For functional operation, ATM 400 includes several software programs that are executable therein, including software for displaying the various screens by which information is visually relayed to the user and software for connecting to a host computer system to initiate security checks (e.g., request for a pin number) when the user enters his ATM card into the card reader slot. Other software code is provided for a host of other functions including managing security and printing receipts following termination of a user transaction. As described above, ATM 400 may be physically co-located with the ATM's banking institution, or may be remotely located with respect thereto. In operation, ATM 400 typically serves as an interface between a user (banking customer) and the ATM network to receive input from the user and to provide necessary output (and funds, when necessary) to the user. ATM 400 receives appropriate associated PIN information and transaction information from the user. This information is passed to the back-end systems for verification and processing, respectively.

Mobile Device-Based Keypad for Enhanced Security

With the above as background, the subject matter of this disclosure is now described. For convenience, the technique of this disclosure is described in the context of user access to a transaction terminal such as the ATM machine described above, but this is not a limitation. The technique may be used in conjunction with any type of access control mechanism, device or facility in which keypad access (physical or virtual) is normally required by the user. Thus, another example operating scenario is a door lock that includes an associated keypad for unlocking the door. There are numerous other examples, such as a keypad used to obtain a product/service (e.g., from a vending or other machine), a keypad used in association with a point-of-sale (POS) or other payment point, or the like. Thus, the reference herein to "transaction terminal" should be broadly construed to refer to any system, device, facility, mechanism, machine, program or process (or "computing entity") that, in association with its keypad, provides a given access by controlling the keypad. The ATM example scenario thus is merely for explanation and should not be taken to limit the scope of this disclosure.

Figure 5:
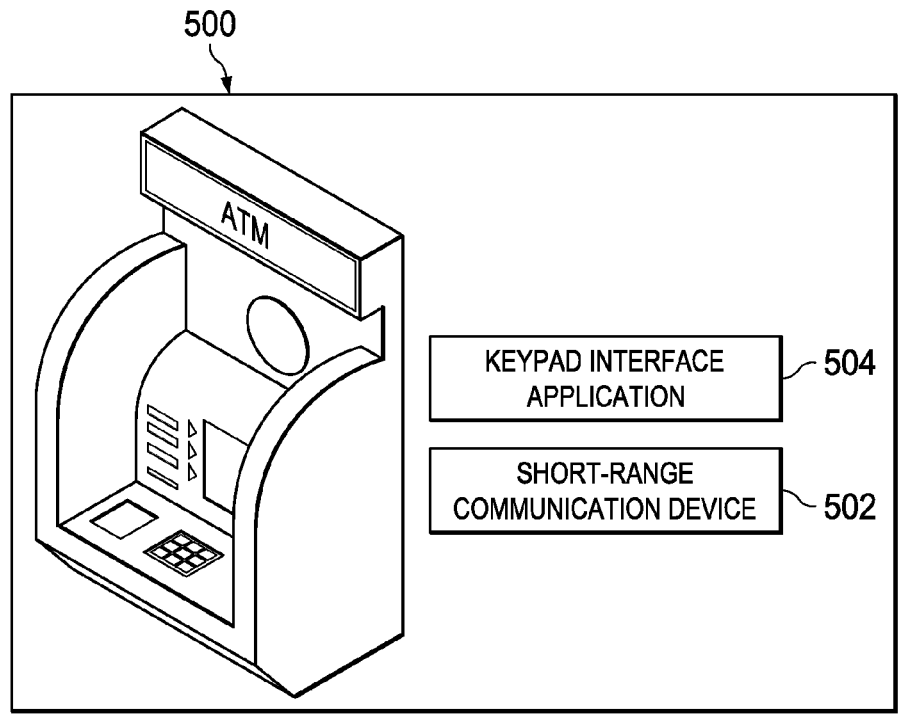
FIG. 5 illustrates a transaction terminal such as illustrated in FIG. 4 that is augmented to include functionality to facilitate the access control technique of this disclosure.

With reference now to FIG. 5, and in accordance with one embodiment of this disclosure, transaction terminal 500 is further configured to include a short-range communication device 502, and a keypad interface application 504. The short-range communication device 502 typically is hardware and software-based, and it communicates via NFC, Bluetooth, Femto, WiFi, or the like. The short-range communication device 502 operates in conjunction with the keypad interface application 504 (which may be integrated therewith) to detect and communicate with an "external keypad device," preferably the mobile device keypad (physical or software-based). The "external" adjective refers to the fact that the keypad is not within or associated (physically) with the transaction terminal in the usual configuration (e.g., FIG. 4). Rather, the external keypad device preferably is used in lieu of the transaction terminal keypad. In an alternative operating scenario, the external keypad device is used in association with the transaction terminal keypad, but this requires entry of information on both devices (which may not be desired). Typically, once the external keypad device is operating, the transaction terminal keypad is locked and does not receive user input although this is not a requirement.

Thus, in this approach a keypad (or, more generally, a key-based input device) is implemented as an external keypad device to the terminal expecting the user's password/PIN, wherein the external keypad device being the user's mobile device (or, more specifically, an app executing thereon) that is owned and/or controlled by the user. As will be described, the external keypad device communicates with the terminal expecting the password/PIN, displays an interface (e.g., the software-based virtual keypad) that receives the user-entered password/PIN, which are then sent securely to the transaction terminal. Prior to transmitting the data (or preferably even receiving it on the mobile device), the transaction terminal is authenticated to the mobile device to provide information to the user that the terminal is trusted. Typically, and following entry of the user's password/PIN, a remainder of the user's interaction with the transaction terminal proceeds in the usual manner.

Figure 6:
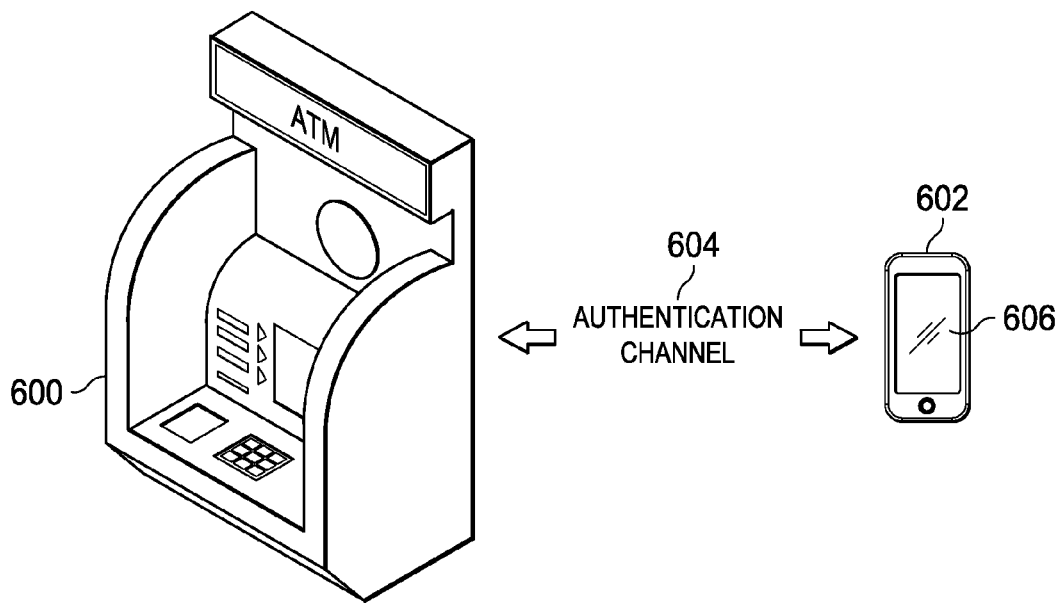
FIG. 6 illustrates the basic access method of this disclosure in which the user's mobile device keypad is used to facilitate the user's access and use of the transaction terminal.

Thus, and with reference now to FIG. 6, this basic operating scenario of this disclosure is now described in detail. An authentication channel 604 is established between a mobile device 602 and a transaction terminal (e.g., an ATM) 600 that uses a keypad (or the like) for access control. The terminal keypad is assumed to be an untrusted user interface because, e.g., it may be monitored or otherwise capable of being compromised. The mobile device 602, in contrast, is a trusted device with a trusted user interface 606 in the form of the keypad (whether physical or software-based) that preferably only the device user can access and use. According to this disclosure, the transaction terminal is augmented to include the short-range communication device, and the keypad interface application, such as illustrated in FIG. 5 and described above. These components are configured to communicate with the external keypad device 606 in the mobile device 602 in lieu of (or in addition to) the transaction terminal's own keypad. The mobile device includes a mobile app (e.g., FIG. 3, application 31) or native application that includes the keypad interface functionality adapted to communicate with the keypad interface application running in the transaction terminal.

Figure 7:
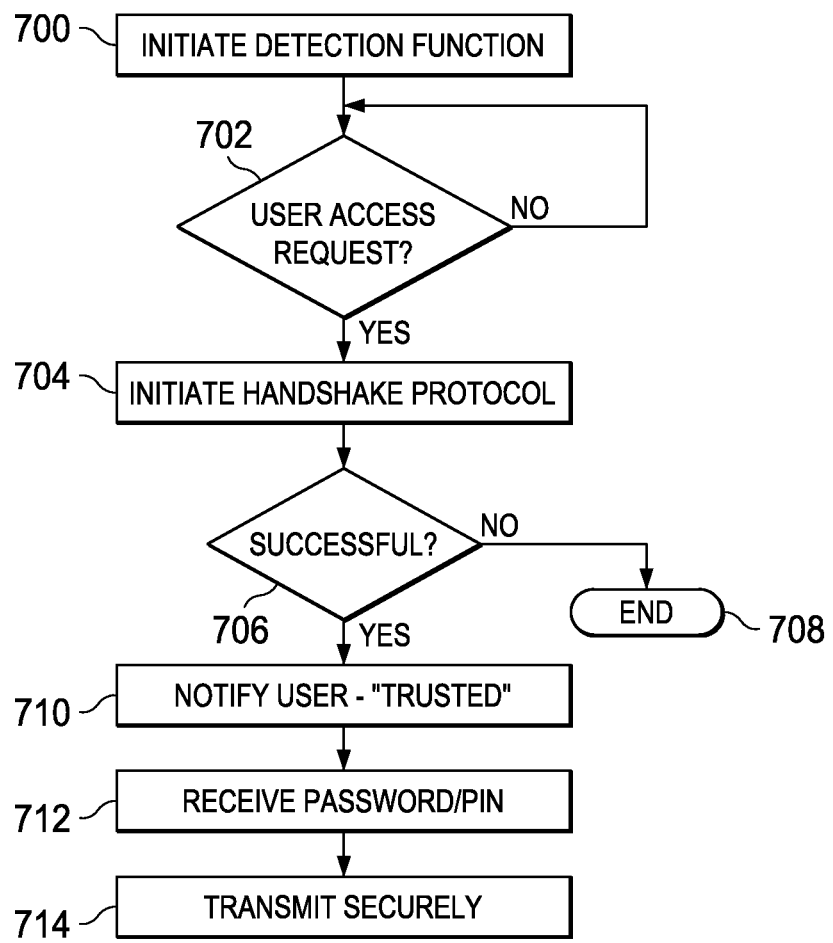
FIG. 7 is a process flow diagram describing the basic access control technique of this disclosure.

Thus, according to this disclosure it is assumed that the mobile device includes the external keypad device and that the transaction terminal is configured with the short-range communication device. Both the mobile device and the terminal are configured with the keypad interface application. This application includes a detection routine, which is now described. The basic process flow is also illustrated in FIG. 7. The detection routine may operate in one or both of the keypad interface applications (where one instance is running in the mobile device, and the other instance is running in the transaction terminal). The process flow in FIG. 7 illustrates the operation from the perspective of the mobile device. The routine is initiated at step 700. A test is performed at step 702 to determine whether a user request for access is detected. This request for access may be initiated at the mobile device by the user taking some predetermined action, such as launching the external keypad device, launching a mobile app associated with the external keypad device, or even just physical proximity of the mobile device (with respect to the transaction terminal). If the outcome of the test at step 702 is negative, the routine cycles waiting for an access request. If, however, the outcome of the test at step 702 is positive, a handshake protocol is initiated at step 704. The handshake protocol is performed between the keypad interface application in the transaction terminal and the keypad interface function in the mobile device. This protocol is designed to establish whether the terminal is trusted by the mobile device and, in particular, the external keypad device executing on the mobile device. A test is then performed at step 706 to determine if the handshake protocol succeeds. If the outcome of the test at step 706 is negative (indicating that the handshake protocol fails), the routine branches to step 708 and ends. If the outcome of the test at step 706 is positive, however, the user is notified that the transaction terminal is trusted. This is step 710. The notification provided in step 710 may be visually, audibly, tactile, or some combination thereof; in an alternative embodiment, the notification is provided implicitly, namely, by allowing the user entry of the credential (password/PIN or other data) to continue from the mobile device keypad. Preferably, however, the notification is an active operation so that the user is aware that he or she can trust the transaction terminal. At step 712, the user then enters his or her password and/or PIN on the mobile device in lieu of direct entry via the terminal keypad. At step 714, the credential data is transmitted over the authentication channel to facilitate the user's access to the rest of the terminal functionality (whatever it may be). Preferably, the authentication channel itself is also secured, e.g., using cryptographic techniques, to ensure that the transmission of the credential and/or other data is not compromised. After the transaction terminal has verified the user credential, the transaction terminal may notify the mobile device that the user authentication and/or authorization (at the terminal) have succeeded, and that the user's ATM transaction can then continue in the usual manner.

The detection technique shown in FIG. 7 may, in the alternative, execute in the transaction terminal, or partly in the transaction terminal and partly in the mobile device. Additional security layers may be used if more robust security is required for the "trust" authentication channel.

The "representation" of the keypad rendered on the mobile device may occur before or after the handshake protocol is initiated, or the representation of the keypad may not be rendered until after the protocol executes successfully. The particular timing of when the representation of the keypad is rendered on the mobile device display thus may vary. Also, the "representation" of the keypad rendered on the mobile device may correspond to the basic soft-keyboard typically rendered by the device, or it may be an application-specific version of the keypad. The mobile device keypad representation may be a facsimile (copy) of the actual keypad that it is emulating, a variant thereof, or a distinct keypad that offers the same basic keypad entry function. Thus, the external keypad device may look the same as the physical keypad, or it may be distinct in whole or in part.

As used herein, the handshaking protocol is any automated (or partially-automated) process of negotiation that dynamically sets parameters of a communications channel established between the two entities (the mobile device, and the transaction terminal, or their pertinent components) before normal communication over the channel begins. In addition to establishing and verifying the basic trust paradigm, the handshake also may negotiate various parameters, such as information transfer rate, coding, parity, cryptographic keys, interrupt procedure, or the like. The particular handshaking protocol (and the data that comprises the negotiation) may be carried over any suitable over-the-air (and network/packet transport) layers. The semantics and syntax of the protocol are not intended to be limited to any particular approach and thus will be implementation-specific.

In the typical operating scenario involving an ATM, the user approaches the terminal and enters his or her ATM card. The user then selects the keypad application running on the device (or, in the alternative) this app opens automatically based on the proximity to the ATM. The keypad application communicates with the terminal, executing the handshake protocol. If the handshake protocol succeeds, the user is informed that the terminal is trusted. The external keypad device is displayed on the mobile device (if not already), and the user enters his or her password, PIN or other required data. The user input is sent to the terminal, preferably in an encrypted manner (e.g., over SSL/TLS). The terminal receives the transmission, decrypts it to recover the user-entered data, and then authenticates the user.

The techniques of this disclosure provide significant advantages. The described approach in effect replaces a component of the transaction terminal (the standard keypad) that is untrusted, with a mobile device-supported and functionally-equivalent component (the external keypad device), which is trusted by the user. No a priori or transaction-based trust model needs to be established in advance or to otherwise enable the user to use the transaction terminal in the usual way. The handshake protocol (between the respective mobile-device based and transaction terminal-based keypad applications) ensures that the user obtains necessary information—namely, that the transaction terminal can be trusted—prior to the user using his or her external keypad device. Theft or other compromise of the user's mobile device does not compromise the system. In particular, possessing the mobile device itself (without possessing the user's credential) does not provide any advantage to the attacker, as it only plays the role of the keypad. By using the mobile device to enter the password/PIN, however, the user avoids the terminal keypad, which may be untrusted because it can be tampered with or otherwise compromised.

The user's entry of the password/PIN via the external keypad device may be augmented to also require the user to enter other biometric information or the like. Thus, for example, the mobile device keypad application may further require entry and receipt of the user's fingerprint before the password/PIN are requested or entered.

Another alternative embodiment is a scenario where the user's external keypad is used to enter a first portion of the user credential, with a second portion (associated with the first portion) of the user credential then being entered on the actual physical keypad of the transaction terminal.

Another alternative embodiment is a scenario where the user's external keypad is used to receive the entirety of the user's credential (as described above), followed by use of the physical keypad at the transaction terminal for receipt of some additional authentication credential or information. This enables a two- or dual-factor authentication technique using two separate and distinct keypads (one trusted, and one un-trusted).

A representative mobile device is one shown in FIG. 3, and a representative transaction terminal is the ATM shown in FIG. 4 (or, more generally, the computing entity shown in FIG. 2).

The operations described above may be carried out using dedicated functionality, as part of some other underlying application (e.g., a banking or other mobile device-based application), or as a separate function or operation by other software dedicated to implementing and supporting the authentication channel. Of course, while the example scenarios involve user access to the terminal, this is not a limitation, as the techniques herein may be implemented with respect to any computing entity application that requires a keypad-based access-control operation and that is otherwise facilitated (as described) with the mobile device-resident external device keypad. As noted, preferably the authentication channel is secured using an appropriate cryptographic scheme (including, without limitation, encryption/decryption, digital signature generation and verification, message validation, and the like).

Further, while the mobile device is shown using the external keypad device to facilitate the user's password/PIN entry, one skilled in the art will appreciate that the same approach may be used to enable the mobile device to control some other dedicated function of the transaction terminal.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality on each of the two sides of the visual authentication channel is implemented in software, which includes but is not limited to firmware, resident software, microcode, and the like. As noted above, these functions may be integrated into other applications (such as webmail, document sharing, or the like), or built into software for this specific purpose (of facilitating the visual data exchange channel). Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The mobile device is not limited to any particular device, configuration, or functionality. The techniques may be practiced in any device (distinct from the computing entity) and that is adapted or configured for the purpose of enabling access to that terminal keypad or other input device using the data transfer channel and methodology in the manner described above.

The techniques herein provide for improvements to another technology or technical field, namely, computing entities that manage keypads for access control, as well as improvements to the functioning of the mobile device itself (by extending its conventional key entry functionality).

Having described our invention, what we now claim is as follows.

The invention claimed is:

1. Apparatus operative in association with a transaction terminal, the transaction terminal having a physical keypad adapted to receive a user credential to enable an authorized access to the transaction terminal, the physical keypad being untrusted, comprising:
   a processor;
   a display;
   computer memory holding computer program instructions executed by the processor, the computer program instructions comprising:
      program code, operative upon detecting an access request and without requiring a trust relationship to be established in advance between the apparatus and the transaction terminal, to attempt to establish an authentication channel between the apparatus and the transaction terminal;
      program code, operative in response to successful establishment of the authentication channel between the apparatus and the transaction terminal, to provide a notification to a user of the apparatus that the transaction terminal is trusted irrespective of the physical keypad being untrusted;
      program code to provide a representation of the physical keypad on the display, the representation being a virtual keypad that corresponds to the physical keypad and is trusted;
      program code operative to receive data input via the representation of the physical keypad, the data being at least part of the user credential and being received in lieu of direct entry via the physical keypad; and
      program code operative to forward the data to the transaction terminal for verification of the authorized access;
   wherein the data is a first portion of the user credential, the first portion being associated with a second portion of the user credential whose entry at the physical keypad is also required for verification of the authorized access.

2. The apparatus as described in claim 1 wherein the notification is provided by at least one of: an aural notification, a visual notification, and a tactile notification.

3. The apparatus as described in claim 1 wherein the computer program instructions further include program code operative to secure the authentication channel using a cryptographic scheme prior to forwarding the data to the transaction terminal.

4. The apparatus as described in claim 1 wherein the program code to attempt to establish the authentication channel includes program code operative to execute a handshake protocol between the apparatus and the transaction terminal.

5. The apparatus as described in claim 1 wherein the transaction terminal is associated with an automated teller machine (ATM).

6. The apparatus as described in claim 1 wherein the data input via the representation of the physical keypad is an entirety of the credential.

7. The apparatus as described in claim 1 wherein the computer program instructions further include program code operative to receive an indication from the transaction terminal that the verification of the authorized access has succeeded.

8. A computer program product in a non-transitory computer readable storage medium for use operative in a mobile device having a display, the mobile device operative in association with a transaction terminal, the transaction terminal having a physical keypad adapted to receive a user credential to enable an authorized access to the transaction terminal, the physical keypad being untrusted, the computer program product holding computer program instructions executed by a hardware processor, the computer program instructions comprising:
   program code, operative upon detecting an access request and without requiring a trust relationship to be established in advance between the mobile device and the transaction terminal, to attempt to establish an authentication channel between the mobile device and the transaction terminal;
   program code, operative in response to successful establishment of the authentication channel between the mobile device and the transaction terminal, to provide a notification to a user of the mobile device that the transaction terminal is trusted irrespective of the physical keypad being untrusted;
   program code to provide a representation of the physical keypad on the display, the representation being a virtual keypad that corresponds to the physical keypad and is trusted;
   program code operative to receive data input via the representation of the physical keypad, the data being at least part of the user credential and being received in lieu of direct entry via the physical keypad; and program code operative to forward the data to the transaction terminal for verification of the authorized access;
   wherein the data is a first portion of the user credential, the first portion being associated with a second portion of the user credential whose entry at the physical keypad is also required for verification of the authorized access.

9. The computer program product as described in claim 8 wherein the notification is provided by at least one of: an aural notification, a visual notification, and a tactile notification.

10. The computer program product as described in claim 8 wherein the computer program instructions further include program code operative to secure the authentication channel using a cryptographic scheme prior to forwarding the data to the transaction terminal.

11. The computer program product as described in claim 8 wherein the program code to attempt to establish the authentication channel includes program code operative to execute a handshake protocol between the apparatus and the-transaction terminal.

12. The computer program product as described in claim 8 wherein the transaction terminal is associated with an automated teller machine (ATM).

13. The computer program product as described in claim 8 wherein the data input via the representation of the physical keypad is an entirety of the credential.

14. The computer program product as described in claim 8 wherein the computer program instructions further include program code operative to receive an indication from the transaction terminal that the verification of the authorized access has succeeded.

15. A transaction terminal having a physical keypad associated therewith adapted to receive a user credential to enable an authorized access, the physical keypad being untrusted, comprising:

a hardware processor;

computer memory holding computer program instructions executed by the hardware processor, the computer program instructions comprising:

program code, operative upon detecting an access request initiated from a mobile device and without requiring a trust relationship to be established in advance between the mobile device and the transaction terminal, to attempt to establish an authentication channel between the mobile device and the transaction terminal;

program code, operative upon successful establishment of the authentication channel between the mobile device and the transaction terminal, to receive data from the mobile device, and to attempt to verify the data and permit the authorized access, the data being received from the mobile device following (i) providing of a notification to a user at the mobile device that the transaction terminal is trusted irrespective of the physical keypad being untrusted, and (ii) receipt of the data input via a representation of the physical keypad rendered on a display associated with the mobile device, the representation being a virtual keypad on the mobile device that corresponds to the physical keypad and is trusted;

wherein the user credential has a first portion, and a second portion, the first portion being the data, and wherein the computer program instructions further include program code operative to receive the second portion or the user credential entered at the physical keypad, the receipt of the second portion required for verification of the authorized access.

16. The transaction terminal as described in claim 15 wherein the mobile device is a user-supplied smartphone, and wherein the physical keypad is associated with an automated teller machine (ATM).

17. The transaction terminal as described in claim 15 wherein the computer program instructions further include program code to facilitate encryption and decryption of communications across the authentication channel.

\* \* \* \* \*